(12) United States Patent
Oroskar (10) Patent No.: US 9,042,347 B1
(45) Date of Patent: May 26, 2015

(54) ACTIVE-SET MANAGEMENT BASED ON AN ASSOCIATED CODEC

(71) Applicant: Sprint Spectrum L.P., Overland Park, KS (US)

(72) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 267 days.

(21) Appl. No.: 13/734,783

(22) Filed: Jan. 4, 2013

(51) Int. Cl.
*H04W 64/00* (2009.01)
*H04W 24/00* (2009.01)
*H04W 36/30* (2009.01)

(52) U.S. Cl.
CPC .............. *H04W 24/00* (2013.01); *H04W 36/30* (2013.01)

(58) Field of Classification Search
CPC ... H04W 4/00; H04W 64/00; H04W 28/0226; H04W 36/00; H04W 36/0005; H04W 36/0088; H04W 36/0094; H04L 47/70; H04L 47/76; H04L 67/148
USPC ......... 370/230–236, 252, 316, 328–332, 347, 370/431, 461; 455/412.1, 424, 432.1, 455/435.1, 435.2, 436, 442–450, 456.1, 455/512, 7, 438, 439, 452.2
See application file for complete search history.

(56) References Cited

U.S. PATENT DOCUMENTS

| | | | |
|---|---|---|---|
| 5,369,681 A | 11/1994 | Boudreau et al. | |
| 5,577,022 A | 11/1996 | Padovani et al. | |
| 5,999,522 A | 12/1999 | Rohani | |
| 6,058,136 A | 5/2000 | Ganesh et al. | |
| 6,160,999 A | 12/2000 | Chheda et al. | |
| 6,181,945 B1 | 1/2001 | Lee | |
| 6,222,347 B1 | 4/2001 | Gong | |
| 6,223,042 B1 | 4/2001 | Raffel | |
| 6,317,453 B1 | 11/2001 | Chang | |
| 6,643,520 B1 | 11/2003 | Park et al. | |
| 6,745,039 B1 | 6/2004 | Di Lalla | |
| 6,922,561 B2 | 7/2005 | Chen et al. | |
| 6,960,939 B2 | 11/2005 | Ngo | |
| 6,963,750 B1 | 11/2005 | Cheng | |
| 7,050,804 B1 | 5/2006 | Wurtenberger et al. | |
| 7,076,265 B2 | 7/2006 | Tayloe et al. | |
| 7,302,265 B1 | 11/2007 | Chalishazar et al. | |
| 7,366,526 B2 | 4/2008 | Zhang et al. | |
| 7,529,546 B1 | 5/2009 | Sigg | |

(Continued)

OTHER PUBLICATIONS

Office Action mailed Oct. 16, 2008 in U.S Appl. No. 11/265,433, filed Nov. 1, 2005, 14 pages.

(Continued)

*Primary Examiner* — Bob Phunkulh
*Assistant Examiner* — Wali Butt (57) ABSTRACT

Embodiments may be implemented to take codec quality into account when helping to manage the active set of a wireless communication device (WCD). An illustrative method may involves a radio access network (RAN) component determining a comparative signal-strength measure for a candidate sector as compared to at least one active sector in the active set of a WCD, determining a comparative codec-quality measure for the candidate sector as compared to the at least one active sector in the active set of a WCD, and based at least in part on both (a) the comparative signal-strength measure and (b) the comparative codec-quality measure, making a determination as to whether or not to add the candidate sector to the active set.

20 Claims, 4 Drawing Sheets

(56) References Cited

U.S. PATENT DOCUMENTS

| | | | |
|---|---|---|---|
| 8,160,634 B1 | 4/2012 | Vargantwar et al. | |
| 8,204,535 B1 | 6/2012 | Shetty et al. | |
| 8,238,906 B1 | 8/2012 | Oroskar et al. | |
| 8,254,930 B1 * | 8/2012 | Mauer et al. | 455/436 |
| 8,363,622 B1 | 1/2013 | Oroskar et al. | |
| 8,526,906 B1 | 9/2013 | Oroskar et al. | |
| 8,649,807 B1 | 2/2014 | Oroskar et al. | |
| 2002/0049058 A1 | 4/2002 | Tee | |
| 2002/0068566 A1 | 6/2002 | Ohlsson et al. | |
| 2002/0119787 A1 | 8/2002 | Hunzinger | |
| 2002/0142772 A1 | 10/2002 | Hunzinger | |
| 2003/0186707 A1 | 10/2003 | Pihl et al. | |
| 2003/0195017 A1 | 10/2003 | Chen et al. | |
| 2005/0020203 A1 | 1/2005 | Losh et al. | |
| 2006/0135173 A1 | 6/2006 | Vannithamby | |
| 2006/0159051 A1 | 7/2006 | English | |
| 2006/0227744 A1 | 10/2006 | Metke et al. | |
| 2006/0229074 A1 | 10/2006 | Semper | |
| 2007/0091836 A1 | 4/2007 | Oprescu-Surcobe et al. | |
| 2007/0097924 A1 | 5/2007 | Martinovich et al. | |
| 2007/0105535 A1 | 5/2007 | Jacobson et al. | |
| 2007/0189261 A1 * | 8/2007 | Choi et al. | 370/347 |
| 2007/0286081 A1 * | 12/2007 | Corazza | 370/236 |
| 2008/0032713 A1 | 2/2008 | Yang | |
| 2008/0076432 A1 | 3/2008 | Senarath et al. | |
| 2008/0096520 A1 | 4/2008 | Benco et al. | |
| 2008/0293437 A1 | 11/2008 | Ranganathan et al. | |
| 2009/0061854 A1 | 3/2009 | Gillot et al. | |
| 2009/0103435 A1 * | 4/2009 | Celentano et al. | 370/232 |
| 2009/0215447 A1 | 8/2009 | Catalano et al. | |
| 2009/0239536 A1 | 9/2009 | Fallgren et al. | |
| 2009/0247137 A1 | 10/2009 | Awad | |
| 2010/0210246 A1 * | 8/2010 | Yang et al. | 455/412.1 |
| 2011/0103346 A1 * | 5/2011 | Durig et al. | 370/331 |
| 2012/0028642 A1 * | 2/2012 | Schliwa-Bertling | 455/436 |
| 2012/0076018 A1 | 3/2012 | Singh et al. | |
| 2012/0178439 A1 * | 7/2012 | Vashi et al. | 455/424 |
| 2013/0194937 A1 * | 8/2013 | Sridhar et al. | 370/252 |
| 2014/0105041 A1 * | 4/2014 | Swaminathan et al. | 370/252 |

OTHER PUBLICATIONS

Scott Baxter, "Course 132 Technical Introduction to CDMA, IS-95 CDMA and a few details of CDMA 2000 1X" available at www.howcdmaworks.com (Feb. 2003) pp. 1-155.

Cai et al., "Mitigating DoS Attacks on the Paging Channel by Efficient Encoding in Page Messages," Computer Science Department, University of California, Davis, Sep. 14-18, 2009, pp. 1-20.

* cited by examiner

ACTIVE-SET MANAGEMENT BASED ON AN ASSOCIATED CODEC

BACKGROUND

To provide cellular wireless communication service, a wireless service provider or "wireless carrier" typically operates a radio access network (RAN) that defines one or more coverage areas in which WCDs can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which WCDs can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other wireless communication device (WCD) that is positioned within coverage of the RAN can then communicate with a BTS and in turn, via the BTS, with other served devices or with other entities on the transport network.

Wireless communications between a WCD and a serving BTS in a given coverage area will typically be carried out in accordance with one or more agreed air interface protocols that define a mechanism for wireless exchange of information between the WCD and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/ or some other mechanism. The forward link, for example, may define (i) a pilot channel on which the RAN may broadcast a pilot signal to allow WCDs to detect wireless coverage, (ii) system parameter channels (e.g., a sync channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link may define, for example: (i) access channels on which WCDs may transmit "access probes" such as registration messages and call origination requests, and (ii) traffic channels on which WCDs may transmit bearer traffic for receipt by the RAN.

In a conventional CDMA wireless network compliant with the IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When a WCD operates in a given sector, communications between the WCD and the BTS of the sector are carried on a given frequency and are encoded by the sector's PN offset and a given Walsh code.

Wireless service providers typically design their wireless networks to comprise a number of partially-overlapping wireless coverage areas. As a WCD that is subscribed to a wireless service provider moves about, the wireless network may hand off the WCD from one wireless coverage area to another. A goal of performing such handoffs is to provide a substantially continuous wireless coverage to the WCD, so that any communication sessions conducted by the WCD are not dropped or degraded due to loss of wireless coverage. Further, to facilitate handoffs, a WCD may have an "active set" of coverage areas (e.g., sectors) that it can be handed off to.

In another aspect, for certain types of communication, such as voice calls, video calls, and/or other types of calls, a WCD may be able to use two or more different types of codecs when engaging in such communication. However, each codec may have different characteristics that impact the extent of resources used when the WCDs are communicating.

OVERVIEW

In an exemplary embodiment, a wireless communication device (WCD) may support various types of codecs. These codecs may define how media content (e.g., voice, music, still images, and/or video) are encoded and decoded. Different codecs may have different features. For instance, a voice codec used by a WCD might encode and decode digital voice at a rate of 1 to 15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec, which typically improves as more bandwidth is utilized.

Herein, a characterization of the quality provided by a codec should be understood to indicate the quality of the media produced by that codec. For instance, a "high-quality codec" should be understood as being a codec that generally produces media of a higher quality (as compared to some other codec that generally produces media of a lower quality).

There may be various scenarios where a radio access network (RAN) assigns a codec to a given WCD, such as during call setup and/or when paging a WCD. When the RAN assigns a codec, the RAN may select from two or more different codecs that are supported by the given WCD. Since wireless spectrum is limited, it may benefit wireless network operators to allocate wireless resources judiciously, and codec selection and assignment is an opportunity to do so. Therefore, when multiple codecs are supported by a particular WCD, a RAN may be configured to consider various factors when determining which codec to assign to the WCD, such as factors indicating the utilization of network resources in the sector where the WCD is located.

In a further aspect, it may be desirable for a WCD not to be handed off from a coverage area where it currently is assigned, or is likely to be assigned, a high-quality codec. In particular, it may be desirable for a WCD to add sectors to its active set in which higher-quality codecs are likely to be assigned, as this may increase the probability of the WCD being handed off to the sector where a higher-quality codec will be assigned Accordingly, exemplary embodiments may involve a RAN and/or a WCD managing a WCD's active set with this purpose in mind. (Of course, it should be understood that this purpose is not limiting, and exemplary embodiments may be implemented with other purposes in mind.) In particular, a RAN may consider the codec quality of a candidate sector for the active sector, as compared to the codec quality of an active sector where a WCD is currently connected, when determining whether the candidate sector should be added to the WCD's active set.

In one aspect, a method may involve a RAN: (i) determining a comparative signal-strength measure based on a comparison of a signal-strength measurement for a candidate sector to a signal-strength measurement for at least one active sector in an active set of a WCD; (ii) determining whether or not the comparative signal-strength measure is less than a first threshold; (iii) if the comparative signal-strength measure is less than a first threshold, then: (a) determining a comparative codec-quality measure based on a comparison of a first codec associated with the candidate sector to a second codec associated with the active sector; (b) determining whether or not the comparative codec-quality measure is greater than a second threshold; and (c) if the comparative codec-quality measure is greater than a second threshold, then sending a message to the WCD that indicates to add the candidate sector to the active set; and (iv) otherwise, refraining from adding the candidate sector to the active set.

In another aspect, a method may involve a RAN: (i) determining a comparative signal-strength measure based on a comparison of a signal-strength measurement for a candidate sector to a signal-strength measurement for at least one active sector in an active set of a WCD; (ii) determining a comparative codec-quality measure based on a comparison of a first codec associated with the candidate sector to a second codec associated with the active sector; (iii) based at least in part on both (a) the comparative signal-strength measure and (b) the comparative codec-quality measure, making a determination as to whether or not to add the candidate sector to the active set; (iv) if the determination is to add the candidate sector to the active set, then sending a message to the WCD that indicates to add the candidate sector to the active set; and (v) otherwise, refraining from adding the candidate sector to the active set.

In a further aspect, an exemplary RAN component may include a non-transitory computer-readable medium and program instructions stored on the non-transitory computer-readable medium. The program instructions may be executable by at least one processor to: (i) determine a comparative signal-strength measure based on a comparison of a signal-strength measurement for a candidate sector to a signal-strength measurement for at least one active sector in an active set of a WCD; (ii) determine a comparative codec-quality measure based on a comparison of a first codec associated with the candidate sector to a second codec associated with the active sector; (iii) based at least in part on both (a) the comparative signal-strength measure and (b) the comparative codec-quality measure, determine whether or not to add the candidate sector to the active set; (iv) if the determination is to add the candidate sector to the active set, then send a message to the WCD that indicates to add the candidate sector to the active set; and (v) if the determination is to not add the candidate sector to the active set, then refrain from adding the candidate sector to the active set.

These and other aspects and advantages will become apparent to those of ordinary skill in the art by reading the following detailed description, with reference where appropriate to the accompanying drawings. Further, it should be understood that the foregoing overview is merely for purposes of example and is not intended to limit the scope of the invention as claimed.

BRIEF DESCRIPTION OF THE DRAWINGS

An exemplary embodiment of the present invention is described herein with reference to the drawings, in which.

DETAILED DESCRIPTION

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting. It will be readily understood that certain aspects of the disclosed systems and methods can be arranged and combined in a wide variety of different configurations, all of which are contemplated herein.

It should be noted that the term "handoff" is to be interpreted broadly herein. Thus, a WCD being "handed off" from a one wireless coverage area to another wireless coverage area may include scenarios in which: (i) the WCD is participating in communication via a first coverage area when a handoff to another coverage area occurs, (ii) the WCD is not participating in communication via a first wireless coverage area when the handoff occurs, and (iii) the WCD is engaged in a call via a first coverage area, the first call is terminated, and soon after the WCD engages in a second call via a second coverage area.

I. Exemplary Communication Networks

Referring to the drawings, as noted above, FIG. 1 is a simplified block diagram of a wireless communication network in which an exemplary method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve, for instance the useful, concrete, and tangible result of helping to improve the paging success rate in an access network.

Figure 1:
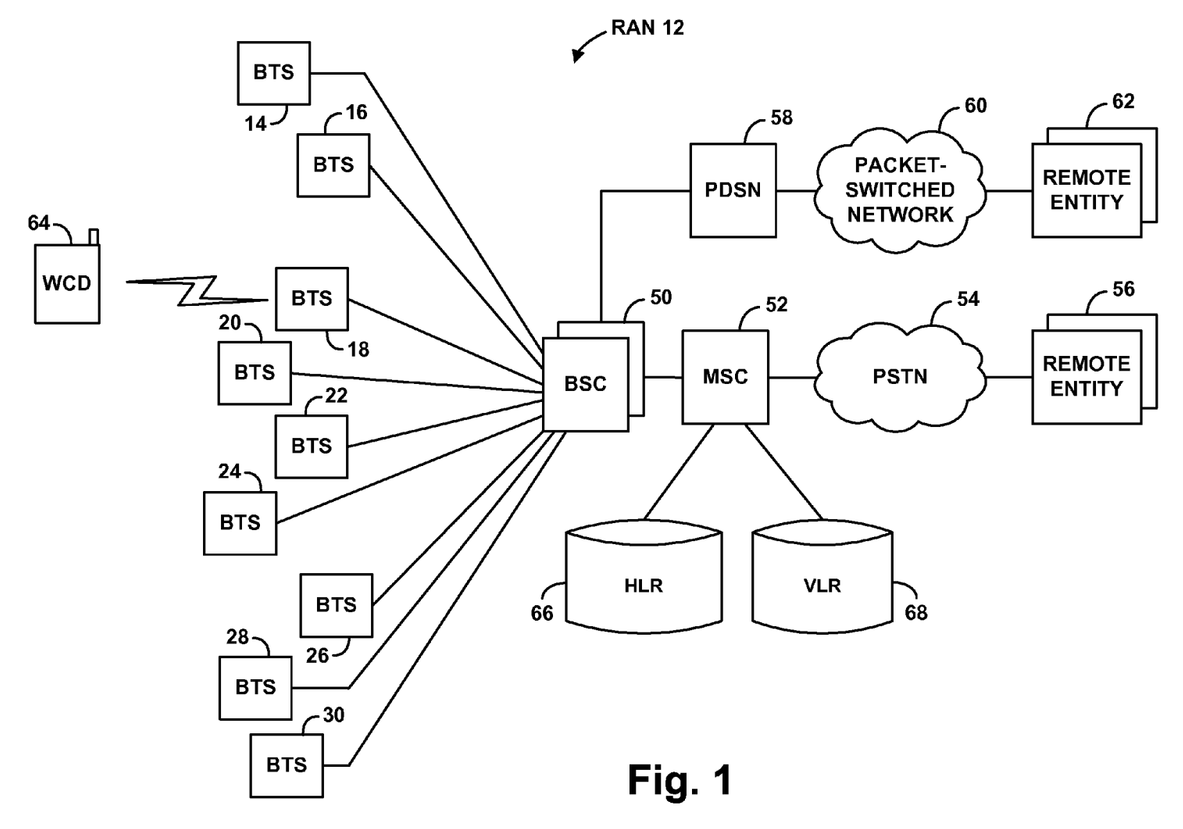
FIG. 1 is a simplified block diagram of a wireless communication network, according to an exemplary embodiment.

As shown in FIG. 1, the exemplary network includes at its core a radio access network (RAN) 12 that radiates to define numerous coverage areas in which wireless communication devices (WCDs) can engage in RF communication with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include numerous base stations (also known as base transceiver stations or BTSs), designated in the figure as base stations 14-30 and one or more base station controllers 50 (which may be integrated with one or more of the base stations). The base stations preferably include directional antennas, power amplifiers, and associated transceiver equipment arranged to establish corresponding wireless coverage areas to communicate with WCDs in those coverage areas. The coverage areas can be cell sites, cell sectors, or some other defined wireless coverage area (possibly even a combination of coverage provided by multiple base stations).

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

In general, a RAN 12 may take various forms and may include any of a variety and number of components, depending for instance on the air interface protocol employed by the RAN. As such, the RAN 12 may vary in degree of complexity, from a simple wireless access point router to a more complex system such as that shown for instance. Further, it should be understood that actions that are generally described as being carried out by the RAN (or simply by the "network" or a "wireless communication network") may be carried out by various different entities or combinations of entities in the RAN, possibly in conjunction with other entities in communication with the RAN. It should also be understood that features and functionality described in reference to one network entity or combination of entities, such as a BTS, BSC, MSC, and/or PDSN, may also be carried out by other entities without departing from the scope of the invention. Yet further, note that the combination of BTS 104 and BSC 106 may be considered a base station. However, BTS 104 or BSC 106 could, taken alone, be considered a base station as well. Additionally, a base station may be considered to be either or both of those devices, and perhaps make use of one or more functions provided by an MSC, a PDSN, and/or any other entity.

FIG. 1 depicts a representative WCD 64 by way of example, which could be a cell phone, wirelessly equipped personal digital assistant (PDA), or any other type of wirelessly-equipped device now known or later developed. The WCD is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above. Further, WCD may include a user interface, which typically includes components for receiving input from a user of WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each WCD, such as WCD 64, typically has at least one associated identifier that uniquely identifies the WCD. By way of example, a WCD may have a unique mobile directory number (MDN), a unique International Mobile Subscriber Identity (IMSI), a unique MAC address, or some other identifier dynamically or statically assigned to the WCD, which may serve as its address for receiving air interface communications transmitted to it by the RAN. As a specific example, an IMSI is a unique number associated with the WCD, typically taking the form of the WCD's phone number. Additionally or alternatively, each WCD may be assigned a mobile identification number (MIN).

To keep track of where WCDs, such as WCD 64 are operating, a RAN 12 may include a visitor location register (VLR) 68 and a home location register (HLR) 66, as shown in FIG. 1. VLR 68 may include information related to WCDs that are currently being served by MSC 52, while HLR 66 may include information related to all WCDs that utilize RAN 12.

In a further aspect, each WCD may have a service profile stored in the HLR 66 and/or in the VLR 68 that corresponds to the MSC 52 that is currently serving a WCD 64. Each MSC 52 may be coupled to the HLR 66 and or its VLR 68 by an out of band signaling network such as a Signaling System #7 (SS7) network, for instance, and may thus access the service profile for a WCD using an identifier for the WCD, such as its MIN, MDN, and/or IMSI.

VLR 68 and/or HLR 66 may obtain information regarding the locations of WCDs through registration messages that the WCDs transmit at various times. For example, a WCD might transmit a registration message that identifies its current cell-sector when the WCD first powers-up, at regular time intervals thereafter (e.g., every 10 minutes), and in response to other triggers (such as moving a certain distance or moving into a different paging zone). These registration messages could be received by VLR 68 and HLR 66. In this way, VLR 68 and HLR 66 may maintain location for each WCD in its service area (which could be, for VLR 68, the area served by MSC 52 and, for HLR 66, all areas served by RAN 12). The location information for a WCD could include an identification of the cell-sector that the WCD reported in its most recent registration message and the date/time of the most recent registration message. HLR 66 and/or VLR 68 could also maintain other types of location information for WCDs.

II. Exemplary RAN Component

Figure 2:
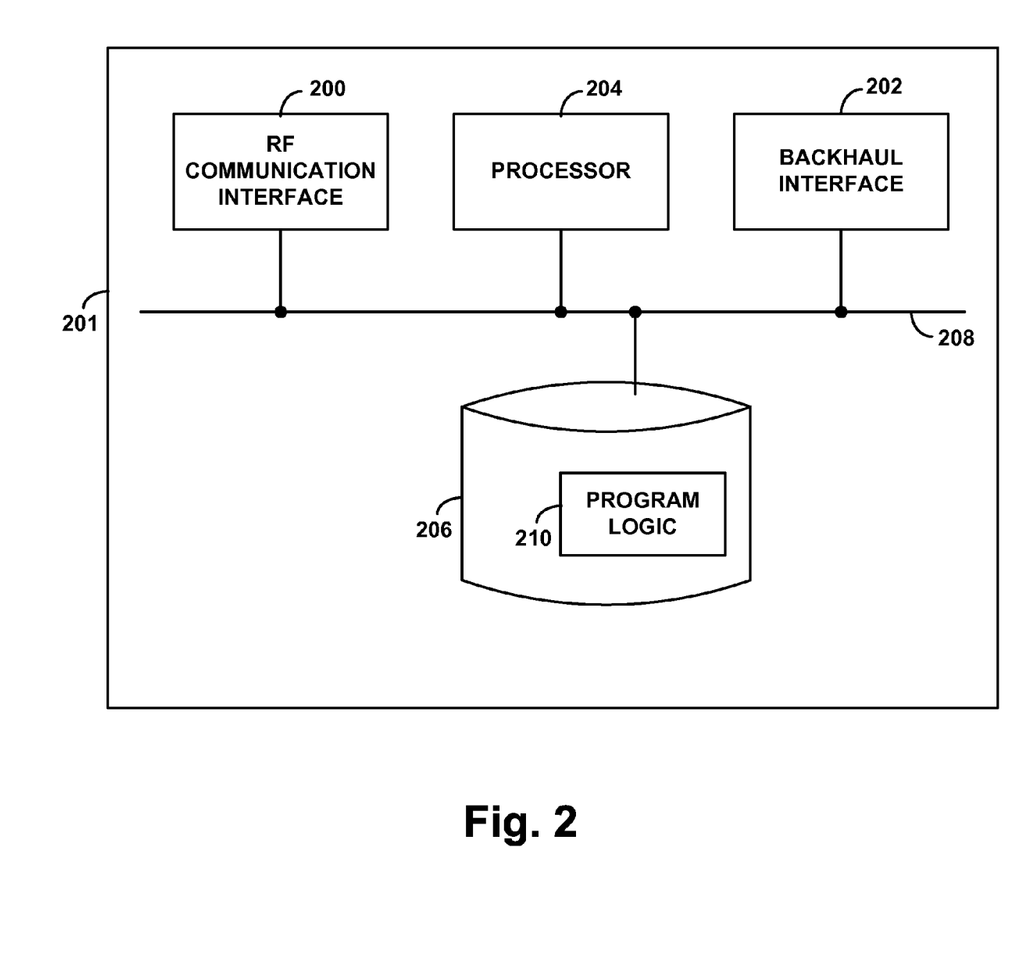
FIG. 2 is a simplified block diagram showing functional components of a radio-access-network component, according to an exemplary embodiment.

FIG. 2 is a simplified block diagram showing functional components of a RAN component 201, according to an exemplary embodiment. RAN component 201, which could be a base station or a switch, for example, or could take another form. As shown, the RAN component 201 may include an RF communication interface 200, a backhaul interface 202, a processor 204, and data storage 206, all of which may be communicatively linked together by a system bus, network, or one or more other connection mechanisms 208.

In practice, RAN component 201 may take the form of or include one or more BTS and/or a BSC, such as BTSs 18-24 and/or BSC 50 for instance, or may take the form of a switch, such as MSC 52. Accordingly, the illustrated components of RAN component 201 (e.g., communication interface 200, a backhaul interface 202, a processor 204, and data storage 206) may be distributed and/or subdivided between one or more BTSs, a BSC, and/or an MSC, or may be implemented in a single BTS, a single BSC, or a single MSC. It should be understood that an exemplary system may also take the form of another network entity or combinations of other network entities, without departing from the scope of the invention. Further, an exemplary system may be implemented in or provided in communication with a base station (or implemented in or provided in communication with any other network entity or entities arranged to carry out analogous functions).

In RAN component 201, RF communication interface 200 may comprise one or more antenna structures, one or more power amplifiers, and associated equipment, for engaging in RF communication with WCDs operating within the base station's coverage, according to one of the air interface protocols noted above for instance. Backhaul interface 202 may comprise any sort of communication link or mechanism enabling the base station to exchange signaling and bearer data with other RAN entities, such as with MSC 52 for instance. Processor 204 may comprise one or more processors (e.g., general purpose and/or special purpose processors), such as microprocessors for instance. And data storage 206 may comprise one or more volatile and/or non-volatile storage components, such as magnetic, optical, or organic storage components, integrated in whole or in part with processor 204. As further shown, data storage 206 preferably contains program logic 210 (e.g., machine language instructions) executable by processor 204 to carry out various functions, such as the functionality of the exemplary methods and systems described herein.

III. Exemplary Codecs

A RAN 12 and/or a WCD 64 may use various types of codecs to encode and/or decode a voice call and/or other types of communications. A codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

In general, there may be a roughly linear relationship between codec bit rate and the media quality (e.g., the voice quality) that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In an exemplary embodiment, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec, which may also be referred to as CMDA service option (SO) 73, supports some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB.

To support both EVRC-B and EVRC-WB, EVRC-NW includes eight capacity operating points (COPs), which may be referred to as EVRC-NW COP 0 to COP 7, or simply as COP 0 to COP 7. Under EVRC-NW, COP 0 is a rate 1 wideband voice encoder. Further, EVRC-NW COP 4 is a narrowband voice encoder as defined under EVRC-B. EVRC-NW COPs 1 to 3 are narrowband voice encoders that provide higher voice quality as compared to EVRC-B, with COP 1 providing the greatest improvement over EVRC-B. Further, EVRC-NW COPs 5 to 7 are narrowband voice encoders that provide lower voice quality as compared to EVRC-B, with COP 5 being the closest to EVRC-B in quality.

In an exemplary embodiment, a RAN 12 may be configured to determine which codec or codecs are supported by a given WCD, and to assign one of the supported codecs to the WCD to use for a given communication. The RAN 12 may determine the codec or codecs that are supported by a particular WCD in various ways. For example, when a WCD 64 originates a call, the WCD 64 may transmit an origination message to the RAN 12. This origination message may include an indication of the service options supported by the WCD 64. For instance, the origination message may include the WCD's preferred service option (e.g., service option 73) as well as one or more auxiliary service options (e.g., service option 3 and/or service option 68) that the WCD also supports.

Further, for a WCD receiving a call (e.g., a callee WCD), the RAN may store or have access to a profile that includes indications of the service options supported by the WCD. This profile may also specify the WCD's preferred service option as well as one or more auxiliary service options that the WCD also supports. Thus, for an incoming call to a callee WCD, the RAN may receive an indication that a call has arrived at the RAN for the callee WCD, access the profile of the callee WCD to determine the supported codecs, and based on various factors discussed in more detail below, determine which codec to assign to the callee WCD for the call.

In some embodiments, the HLR and/or the VLR may indicate the service option capabilities for individual WCDs that have registered with the RAN. For example, the HLR and/or VLR may indicate that a particular WCD is configured for SO 73. In an exemplary embodiment, this may be interpreted as implying that the particular WCD is capable of using any of COP 1 to COP 7, and that a base station (e.g., a BTS), may negotiate whether the particular WCD is capable of COP 0 (i.e., HD Voice).

As such, before a BTS 18 pages a WCD 64 for a voice call, the BTS may coordinate with its serving MSC to access the VLR and determine which service options are supported by the WCD 64. Further, when a WCD that supports EVRC-NW (i.e. SO 73) acknowledges a page by sending the RAN 12 a page response message, the WCD may also indicate the particular operating points that are supported by the WCD in the page response message.

In an exemplary embodiment, a BTS may consider various factors when determining which codec should be assigned to a WCD for a given call. For example, in some embodiments, the BTS may consider the utilization of at least part of the RAN infrastructure. If the utilization of a wireless coverage area serving the WCD, a wireless coverage area that is likely to serve the WCD, a BTS, a BSC, and/or a backhaul link between any RAN and/or non-RAN components is too high, it may be preferable to instruct the WCD to use a codec with a lower expected bit rate, such as EVRC-A or EVRC-B. However, if this utilization—or utilizations—is not too high, it may be preferable to allow the WCD to use a codec that supports a higher expected bit rate, and thereby potentially increasing the media quality of the call. In this latter case, the BTS may instruct the WCD to use a codec with a higher expected bit rate, such EVRC-NW COP 0 or COP 1.

Once the RAN (e.g., a BTS) has assigned a codec to a WCD to use for a call, the RAN may notify the WCD of the assigned codec. For example, according to SO 73, a base station may send the WCD a Service Option Control message that includes the particular operating point that is assigned to the WCD for the call (e.g., one of COP 0 to COP 7). Other examples are also possible.

In some embodiments, a RAN may attempt to assign EVRC-NW COP 0 to all WCDs that support COP 0, unless the utilization of network resources in a coverage area is too high. This may be done in an effort to provide WCDs with the best call quality that is possible, and/or for other reasons. In the event that the utilization is too high, then the RAN may select a codec that provides lower quality, such as one of EVRC-NW COPs 1 to 7.

Determining whether the utilization is "too high" may be based on one or more utilization thresholds. For instance, the RAN may measure the utilization of a wireless coverage area serving the WCD and compare the measured utilization to a utilization threshold. If the measured utilization exceeds the utilization threshold, the RAN may instruct the WCD to use EVRC-B. Otherwise, the RAN may instruct the WCD to use EVRC-WB or EVRC-NW. The utilization threshold may be represented as a percentage, such as 30%, 40%, 50%, 60%, 70%, and so on.

It should be understood that the codecs described herein are only examples. Other voice or non-voice codecs may be used instead.

IV. Exemplary Handoff Functionality

In an exemplary RAN 12, a WCD 64 may be in communication with one or more wireless coverage areas simultaneously, even if the WCD is only actively using one of these wireless coverage areas to communicate.

Receiving signals from multiple wireless coverage areas simultaneously may provide advantages for a WCD. For instance, doing so allows the WCD to keep track of neighboring wireless coverage areas that are candidates for a handoff. Regularly, or from time to time, the WCD may measure the strength of the signals received from each wireless coverage area. These signals may be received on a traffic channel, a paging channel, or some other type of channel, and the measurements may involve determining the signal-to-noise ratio (SNR) and/or the frame error rate (FER) of the signals.

When a WCD is served by a given wireless coverage area and determines that the signal strength the WCD received from this given wireless coverage area has dropped below a signal-strength threshold, the WCD may request a handoff from the given wireless coverage area to a new wireless coverage area from which the WCD has received a higher signal strength. The WCD may also request a handoff to a new wireless coverage area when the received signal strength of the new wireless coverage area exceeds that of the given wireless coverage area by some amount. As a result of measuring this received signal strength and using these measurements to influence handoff behavior, continuity of wireless service may be improved. For instance, the WCD may be handed off from the given wireless coverage area before it experiences a poor signal strength from the given wireless coverage area that substantially compromises the WCD's ability to communicate.

In an exemplary embodiment, a WCD 64 may be configured to maintain an "active set" that can include multiple sectors (with each included sector being referred to as an "active sector"). A WCD 64 may monitor the signal strength of the active sectors, as well as other sectors that are not in its active set, so that it can request that sectors be added to and/or dropped from the active set.

The RAN may provide a WCD 64 with settings for parameters that help the WCD determine when to request that sectors be added to and/or dropped from its active set. For instance, under IS-2000, a base station may provide a WCD the following parameters, which relate to pilot signal strength and are used by the WCD to maintain its active set:

T_ADD: Threshold pilot strength for addition to the active set (e.g., −14 dB).

T_COMP: Threshold difference in signal strength from an active set pilot (e.g., 2 dB).

T_DROP: Threshold pilot strength for removal from the active set (e.g., −16 dB).

T_TDROP: Time for which an active set pilot falls below T_DROP to justify removal from the active set (e.g., 2 seconds).

The base station also provides the WCD with a Neighbor List Update Message (NLUM), which identifies the "neighbor" sectors, which are not in the active set, but have been identified as candidates for the active set.

The WCD 64 then scans for all of the pilot signals from the sectors in its active set, and measures the received signal strength for each. For example, WCD 64 may calculate Ec/Io for each sector in the active set, where Ec is energy per chip and Io is the total power received. If the pilot signal strength of any neighbor sector exceeds T_ADD, the WCD 64 adds the pilot to its "candidate" set and sends a Pilot Strength Measurement Message (PSMM) to the base station with the estimated Ec/Io for the pilot and information indicative of the identity of the sector.

Further, if the pilot strength exceeds the strength of any active-sector signal by T_COMP (and possibly also depending on current capacity and other issues), then the base station may send a Handoff Direction Message (HDM) to the WCD, listing the pilot as a new member of the active set. Upon receipt of the HDM, the WCD 64 then adds the pilot to its active set as instructed, and the WCD sends a Handoff Completion Message (HCM) to the base station (e.g., to BTS 108), acknowledging the instruction, and providing a list of the pilots (PN offsets) in its active set. Depending on system configuration, the WCD may also identify pilot signals from the remaining set of sectors that exceed the thresholds. It should be understood that each active sector in the active set is represented by its corresponding PN offset, and that references to an active sector may also be considered to refer to the PN offset of the active sector.

Similarly, if the WCD 64 detects that the signal strength of a pilot in its active set drops below T_DROP, the WCD starts a handoff drop timer. If T_TDROP passes, the WCD then sends a PSMM to the base station, indicating the Ec/Io and drop timer. The base station may then respond by sending an HDM to the WCD, without the pilot in the active set. The WCD would then receive the HDM and responsively move the pilot to its neighbor set and send an HCM to the base station.

Under IS-2000, a WCD 64 may continually scan its active sectors, neighbor sectors, and candidate sectors in a cyclical manner, according to a schedule under which active sectors are scanned twice as frequently of neighbor sectors, and neighbor sectors in turn are scanned twice as frequently as candidate sectors. The details of this scanning process are generally known to those skilled in the art, and thus not discussed in further detail herein. Further, when the WCD 64 is engaged in IS-2000 communications, WCD 64 typically decodes transmissions using all the PN offsets in its active set, together with the respective Walsh codes assigned for each PN-identified sector. Then, on a frame-by-frame basis, the WCD may select a sector from its active set from which to receive forward-link traffic.

In a further aspect, a WCD 64 and/or a RAN 12 may be configured to consider codec quality when determining whether a given sector should be added to or dropped from the active set. More specifically, in an exemplary embodiment, a BSC may be configured to consider the codec quality of a candidate sector, as compared to one or more active sectors, when determining whether the candidate sector should be added to the active set of a given WCD. In particular, the RAN may be more likely to instruct the WCD to add a candidate sector where the WCD would likely be assigned a higher-quality codec than it is currently assigned in its primary active sector, than a candidate sector where the WCD would likely be assigned a lesser-quality codec. For example, a RAN may instruct a WCD to add a candidate sector where the likely-to-be-assigned codec is of higher quality, or at least is not of a significantly worse quality, than the codec the WCD is currently assigned in its primary active sector.

Similarly, a RAN may be configured to consider the codec quality of an active sector, as compared to one or more other active sectors and/or one or more candidate sectors, when determining whether the candidate sector should be dropped from the active set of a given WCD. In particular, the RAN may be more likely to instruct the WCD to add a candidate sector where the WCD would likely be assigned a higher-quality codec, than a candidate sector where the WCD would likely be assigned a lesser-quality codec.

In order to take codec quality into account, a BSC may be configured to query the BTSs that it serves in order to determine the particular codecs that are assigned to particular WCDs served by each BTS. For instance, to determine the codec that is assigned to a WCD in its primary active sector, the BSC may query the BTS that serves the primary active sector. A BSC could also be configured to query the BTSs that it serves in order to determine the particular codec or codecs that are assignable at a given point in time.

Note that an assignable codec should be understood to be a codec that would be assignable to a WCD at a given point in time, if the WCD were to be assigned a codec. For example, to determine an assignable codec for a WCD in a candidate active sector (where the WCD may not currently be assigned any codec), the BSC may query the BTS that serves the candidate active sector. The BTS may then determine the codec that would be assigned to a WCD if, for example, a call were to be initiated at that time. To do so, the BTS may select a codec in the same way it would if it were assigning a codec to the WCD (e.g., based on network utilization), but refrain from actually assigning the codec.

To implement some or all of the above functionality (and other RAN functionality described herein), an exemplary RAN component may include a tangible computer-readable medium with program instructions stored thereon, which are executable by a processor to carry out the various functions described herein. For example, an exemplary base station or switch may include program instructions that are executable to: (i) determine a comparative signal-strength measure based on a comparison of a signal-strength measurement for a candidate sector to a signal-strength measurement for at least one active sector in an active set of a WCD, (ii) determine a comparative codec-quality measure based on a comparison of a first codec associated with the candidate sector to a second codec associated with the active sector, (iii) based at least in part on both (a) the comparative signal-strength measure and (b) the comparative codec-quality measure, make a determination as to whether or not to add the candidate sector to the active set; (iv) if the determination is to add the candidate sector to the active set, then send a message to the WCD that indicates to add the candidate sector to the active set, and otherwise, refrain from adding the candidate sector to the active set.

V. Exemplary RAN-Implemented Methods

An exemplary method may be carried out by a RAN component in an effort to improve the quality of codecs selected for a WCD via intelligent management of the WCD's active set. In particular, the WCD may consider comparative codec quality when determining whether sectors should be added to and/or removed from the active set. An exemplary method may be carried out for other reasons as well, without departing from the scope of the invention.

Figure 3:
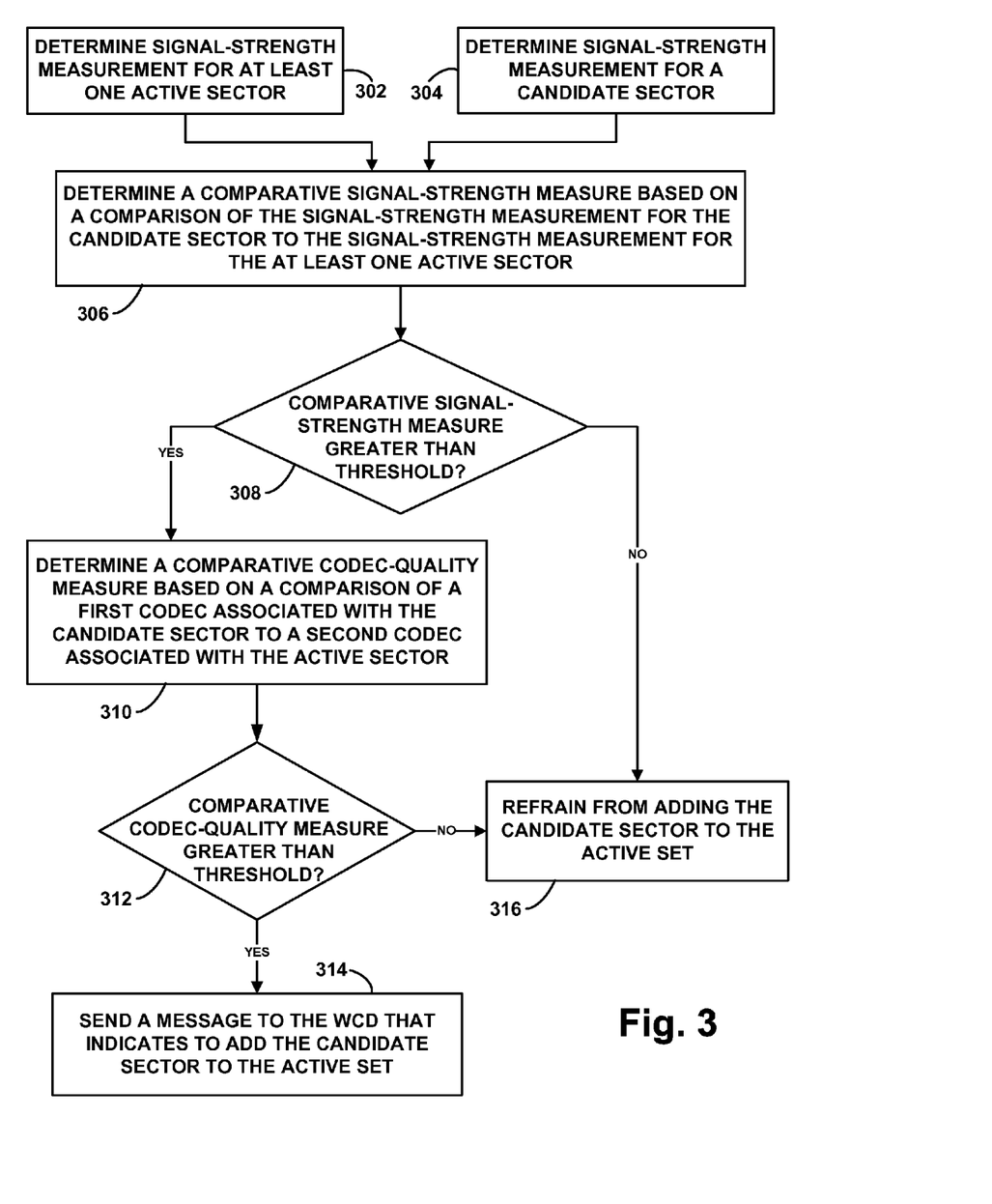
FIG. 3 is a flow chart illustrating a method, according to an exemplary embodiment.

For example, FIG. 3 is a flow chart illustrating a method 300 that may be implemented by a BSC, according to an exemplary embodiment. Exemplary methods, such as method 300, may be described by way of example as being carried out by a BSC. However, an exemplary method or portions thereof may be carried out by another entity or a combination of entities, without departing from the scope of the invention. Further, it should be understood that references herein to a RAN performing various functions encompass embodiments where a component or components of a RAN, such as a BTS, a BSC, and/or an MSC, carry out the some or all of the described functionality.

Referring to method 300 in greater detail, blocks 302 and 304 involve the BSC determining the signal-strength measurement for the at least one active sector and the signal-strength measure for a candidate sector. This may simply involve the BSC receiving a message or messages that originated from the WCD and indicate the signal-strength measurements for the at least one active sector and the candidate sector. For example, a WCD may send one or more PSMMs that indicate the signal strength for its primary active sector (and possibly other active sectors) as well as for the candidate sector. The one or more PSMMs may be received at the BTS or BTSs serving these sectors, and then relayed to the BSC by the BTS or BTSs.

Method 300 further involves the BSC determining a comparative signal-strength measure based on a comparison of the signal-strength measurement for the candidate sector to the signal-strength measurement for the at least one active sector, as shown by block 306. The BSC may then determine whether or not the comparative signal-strength measure is less than a first threshold, as shown by block 308. If the comparative signal-strength measure is less than the first threshold, then the BSC may determine a comparative codec-quality measure based on a comparison of a first codec associated with the candidate sector to a second codec associated with the active sector, as shown by block 310. Further, the BSC may determine whether or not the comparative codec-quality measure is greater than a second threshold, as shown by block 312. If the comparative codec-quality measure is greater than the second threshold, then the BSC may send a message to the WCD that indicates to add the candidate sector to the active set, as shown by block 314. Otherwise, the BSC may refrain from adding the candidate sector to the active set, as shown by block 316.

In an exemplary embodiment of method 300, the candidate sector may be compared to the primary active sector, which the WCD is currently connected to. For instance, the BSC may receive a PSMM indicating the Ec/Io for the candidate sector and the primary active sector (and possibly the Ec/Io for other candidate sectors and/or active sectors), as determined by the WCD. The BSC may then compare Ec/Io for the primary active sector to Ec/Io for the candidate sector to determine whether the difference in signal strength is less than T_COMP. If the difference is less than T_COMP, then the BSC may proceed to compare the codec quality of the candidate sector to the codec quality of the primary active sector, and instruct the WCD to add the candidate sector only if the difference in codec quality, as indicated by a comparative codec-quality measure, is greater than a threshold value.

A. Determining Whether or not the Comparative Signal-Strength Measure is Less than a Threshold As noted above, blocks 306 and 308 involve the BSC determining a comparative signal-strength measure, and then determining whether or not the comparative signal-strength measure is less than the first threshold.

To do so, the BSC may determine a numerical value that is indicative of the difference in signal strength (i.e., the comparative signal-strength measure), and then comparing the numerical value to a threshold value. For instance, the BSC may subtract the Ec/Io for the candidate sector from the Ec/Io for an active sector and compare the resulting difference to T_COMP. As a specific example, if the Ec/Io for the candidate sector is −11 dB and the Ec/Io for the active sector is −8 dB, then the BSC may determine the comparative signal-strength measure to be equal to 3 dB. If the T_COMP threshold is set at 4 dB, then the BSC may proceed to evaluate the relative codec quality of the candidate sector, as compared to the active sector.

B. Determining Whether or not the Comparative Codec-Quality Measure is Greater than a Threshold Once the BSC has determined that the comparative signal-strength measure is less than the first threshold, the BSC may determine whether the candidate sector should be added based on the comparative codec quality of the candidate sector (as compared to the primary active sector). Specifically, the BSC may determine whether the codec quality of the candidate sector is better than, or within a certain range of, the codec quality of the primary active sector. To do so, the BSC may determine a comparative codec-quality measure, at block 310, and then determine whether or not the comparative codec-quality measure is greater than a second threshold, at block 312.

To determine the measure of comparative codec quality at block 310, a BSC may first need to determine what the first codec and the second codec are (e.g., the specific codec(s) associated with the at least one active sector and the candidate sector). As explained above, this may involve the BSC receiving both an indication of the first codec from the BTS that serves the at least one active sector and an indication of the second codec from the BTS that serves the candidate sector.

Note that the active sector and the candidate sector may be served by the same BTS or different BTSs. Further, the BTSs serving the active sector and the candidate sector may both be served by the same BSC, or could be served by different BSCs. In the latter case, the BSC that is carrying out the method may coordinate, via its serving MSC, with the BSC serving the active or candidate sector (whichever is not served by the BSC performing the method) to determine the codec quality for the active or candidate sector. The other BSC may determine the codec associated with the sector it serves in the same manner as the BSC that is carrying out the method, and send the associated codec to the BSC carrying out the method.

In a further aspect, the first and second codecs may be the same codec, or may be different codecs. For instance, in one case, the assigned codec in the primary active sector might be EVRC-NW COP 0, and at the same time, the assignable codec in the candidate sector is also EVRC-NW COP 0. However, in another case, the assigned codec in the primary active sector could be EVRC-NW COP 4, while the assignable codec in the candidate sector is EVRC-NW COP 1. Other examples are also possible.

In an exemplary embodiment using EVRC-NW, the codec quality of a particular codec may be indicated by the COP value of the codec. For instance, at block 310, the first and the second codec may be identified by a first and a second EVRC-NW operating mode value, respectively. As an example, if the assignable codec in the candidate sector is EVRC-NW COP 1 and the assigned codec in the primary active sector is EVRC- NW COP 4, then the codec-quality measure associated with first and the second codec (e.g., with the candidate and active sector, respectively) may be 1 and 4, respectively.

Once the codec-quality measures for each codec have been determined, the BSC may then determine the comparative codec-quality measure by determining the difference between the individual codec-quality measures. For instance, the BSC may determine the difference between the first EVRC-NW operating mode value and the second EVRC-NW operating mode value to determine an operating-mode-difference value. The operating-mode-difference value may be calculated, for instance, by subtracting the COP value of the candidate sector from the COP value of the active sector. As an example, in the above scenario where the codec-quality measures associated with candidate and active sectors are 1 and 4, respectively, the BSC may determine the operating-mode-difference value to be equal to −3. Many other examples are also possible.

At block 312, to determine whether or not the comparative codec-quality measure is greater than the second threshold, a BSC may use various techniques.

For example, the BSC may determine whether or not the comparative codec-quality measure is greater than a threshold operating-mode value difference. For instance, consider the above example where the codec-quality measures associated with candidate and active sectors are 1 and 4, respectively, and the operating-mode-difference is calculated to be equal to 3. In this scenario, if a threshold operating-mode value difference is set to zero, then the BSC will instruct the WCD to add the candidate sector.

Note that the threshold operating-mode value difference of zero means that a WCD should add the candidate sector when the candidate sector has the same or a greater codec quality than the active sector. And, in the above scenario, the candidate sector's codec, EVRC-NW COP 1, is a higher quality codec than the active sector's codec, EVRC-NW COP 4, so the BSC instructs the WCD to add the candidate sector to its active set.

C. Sending the Message to the WCD

At block 314, a BSC may send the message that indicates to add the candidate sector in various ways. In an exemplary embodiment, the BSC may send an HDM to the WCD, which indicates to include the candidate sector in the active set. More specifically, a BSC may send an HDM via the BTS that is serving the WCD (e.g., the BTS serving the primary active sector) or instruct the BTS that is serving the WCD to send an HDM. In other embodiments, other types of messages can be utilized to indicate that a WCD should include a candidate sector in its active set, without departing from the scope of the invention.

D. Exemplary Application

To illustrate an application of method 300, consider a scenario where a WCD is connected to a primary active sector PN1, where the WCD is assigned EVRC-NW COP 3, where the BSC has received a PSMM identifying a candidate sector PN2. Further, in this example, the Ec/Io for the candidate sector PN2 is −10 dB and the Ec/Io for the primary active sector PN1 is −11 dB. In addition, for purposes of this example application, the T_COMP threshold may be set to 3 dB, and the threshold for comparative codec quality may be set to −1. In this scenario, a candidate sector will be added if both (a) the signal strength for the candidate sector PN2 is not more than 3 dB worse than the signal strength for the primary active sector PN1 and (b) the operating mode value for the candidate sector PN2 is not more than one operating mode worse than the operating mode value for the candidate sector PN1.

For instance, the BSC may determine that the comparative signal-strength measure for the candidate sector PN2, as compared to the active sector PN1, to be equal to −1 dB. Since the comparative signal-strength of −1 dB is less than the T_COMP threshold of 3 dB, the BSC may proceed to evaluate the comparative codec quality of candidate sector PN2 as compared to the primary active sector PN1.

In particular, the BSC may query the BTS serving the candidate sector PN2 to determine the codec that would be assigned to the WCD in sector PN2, if the WCD were being assigned a codec at that time. (Alternatively, if the BTS serving the candidate sector PN2 is also the BTS that forwarded the PSMM to the BSC, then the BTS may have already inserted in the PSMM or otherwise provided the BSC with an indication of the codec that would likely be assigned in the candidate sector.) If the assignable codec in the candidate sector PN2 is EVRC-NW COP 1, then the BSC may determine the comparative codec-quality measure to be equal to 2 by subtracting the operating mode value of the candidate sector PN2 (1) from the operating mode value of the primary active sector PN1 (3). The BSC may then determine whether or not the comparative codec-quality measure is greater than the threshold value. Specifically, since the threshold value in this example is −1, the BSC may instruct the WCD to add the candidate sector PN2 to the WCD's active set.

In some instances, a WCD may indicate two or more candidate sectors at the same time. Accordingly, an exemplary method, such as method 300, may be applied to evaluate multiple candidate sectors that are identified to the RAN at substantially the same time. For instance, method 300 may be implemented to evaluate two candidate sectors indicated by a WCD in the same PSMM or in two or more PSMMs received at the same time or within a certain short period of time from one another.

E. Exemplary Method Using a Combination of Signal Strength and Codec Quality

As described above, method 300 may first involve a BSC determining that the comparative signal-strength measure (e.g., T_COMP) is less than a threshold, before the BSC considers whether the comparative codec quality warrants the addition of a candidate sector to the active set. (Note, that it is also possible that the RAN could first consider whether the comparative codec-quality measure satisfies some other kind of threshold criteria, and only proceed to consider the comparative signal-strength measure if the threshold criteria for the comparative codec quality is satisfied.) In other embodiments, the BSC may combine the comparative signal-strength measure and the comparative codec-quality measure to obtain a combined comparative measure that can be used to determine whether a sector should be added to the active set.

By considering comparative signal strength and codec quality at the same time, a BSC may take into account and weigh both the degree to which the signal strengths of the active sector and the candidate sector differ, and the degree to which the codec qualities of the active sector and the candidate sector differ. Specifically, if the difference in codec quality is lesser (e.g., if the codec quality of the candidate sector is less of an improvement over the active sector), then more of a difference in signal strength may be required before a WCD is instructed to add a candidate sector (e.g., the candidate sector may need to provide a greater improvement in signal strength over the active sector), and vice versa.

Figure 4:
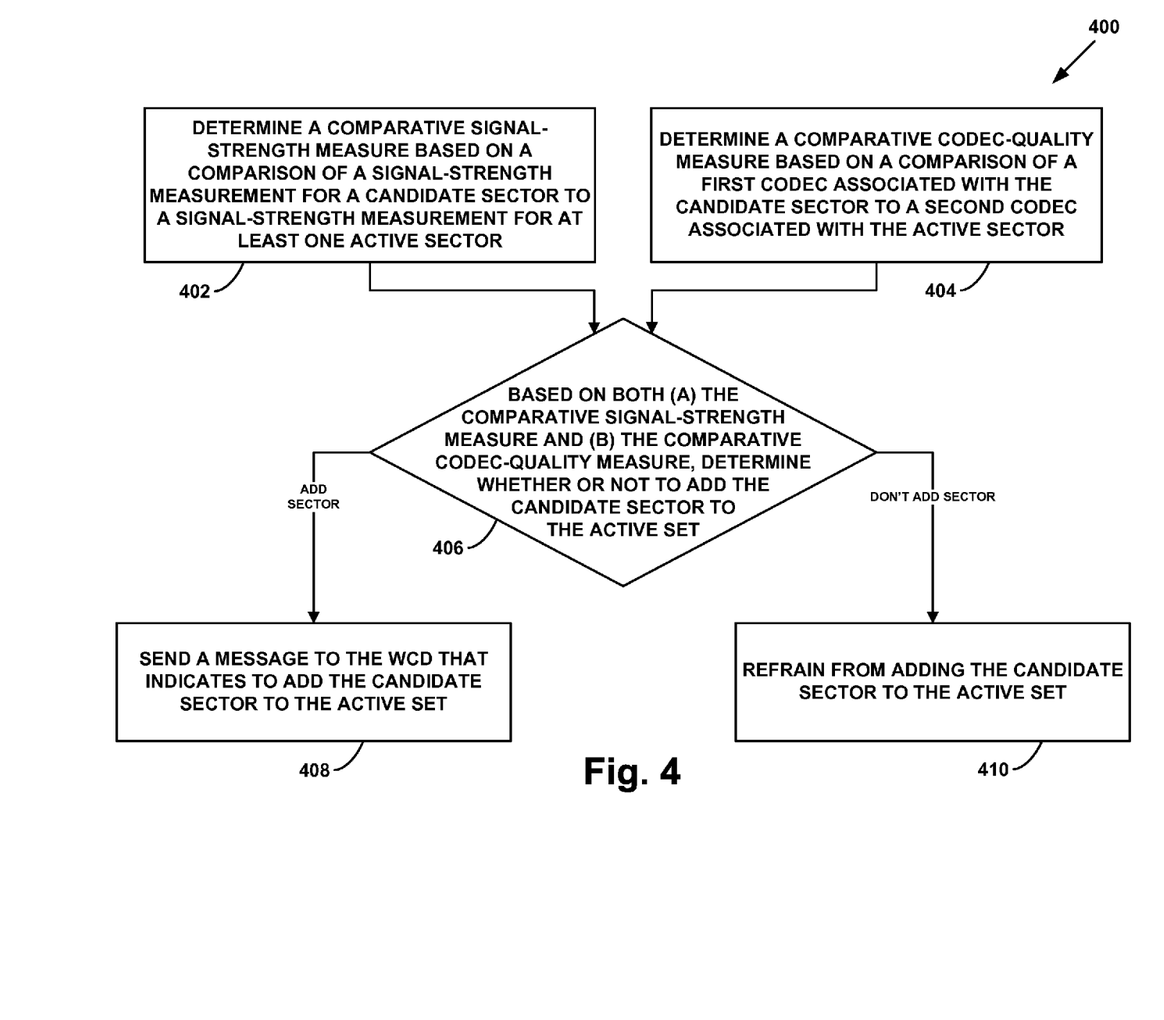
FIG. 4 is a flow chart illustrating another method, according to an exemplary embodiment.

FIG. 4 is a flow chart illustrating another method 400, according to an exemplary embodiment. Method 400 involves a BSC determining a comparative signal-strength measure based on a comparison of a signal-strength measurement for a candidate sector to a signal-strength measurement for at least one active sector, as shown in block 402. The BSC may also determine a comparative codec-quality measure based on a comparison of a first codec associated with the candidate sector to a second codec associated with the active sector, as shown by block 404. Then, based at least in part on both (a) the comparative signal-strength measure and (b) the comparative codec-quality measure, the BSC makes a determination as to whether or not to add the candidate sector to the active set, as shown by block 406. If the determination is to add the candidate sector to the active set, then the BSC sends a message to the WCD that indicates to add the candidate sector to the active set, as shown by block 408. Otherwise, the BSC refrains from adding the candidate sector to the active set, as shown by block 410.

When performing method 400, the BSC may determine the comparative signal-strength measure and/or the comparative codec-quality measure in the same or similar manners as described above, in reference to method 300.

Further, the BSC may use various techniques, based on the comparative signal-strength measure and the comparative codec-quality measure, to determine whether or not a candidate sector should be added to the active set. For instance, in an exemplary embodiment, the BSC may determine a score for the candidate sector based on both the comparative signal-strength measure and the comparative codec-quality measure, and compare the score to a threshold score.

As a specific example, consider an embodiment where the comparative signal-strength measure is a decibel-difference value between the Ec/Io measurements in the active sector and the candidate sector, and where the comparative codec-quality measure is an operating-mode-difference value (e.g., the difference in COP value) between the active sector and the candidate sector. In such an embodiment, the BSC may determine the score for the candidate sector by determining a sum of the decibel-difference value and the operating-mode-difference value.

To illustrate an exemplary application, consider a scenario where a WCD is connected to a primary active sector PN1 where the WCD is assigned EVRC-NW COP 2, and where the BSC has received a PSMM identifying a candidate sector PN2, and where the BSC has determined that the comparative signal-strength measure for the candidate sector PN2 is less than T_COMP. As such, the BSC may proceed query the BTS serving the candidate sector PN2, to determine the codec that would be assigned to the WCD in sector PN2, if the WCD were being assigned a codec at that time. If the assignable codec in the candidate sector PN2 is COP EVRC-NW COP 2, then the BSC may determine the operating-mode-difference value to be equal to 0 by subtracting the operating mode value of the candidate sector (2) from the operating mode value of the active sector (2).

In some embodiments, the comparative signal-strength measure and/or the comparative codec-quality measure may be normalized, as part of determining the score for the candidate sector. In particular, when the comparative signal-strength measure is determined by subtracting the Ec/Io of the candidate sector from the Ec/Io of the active sector, a lower comparative signal-strength measure may indicate that the candidate sector provides more of an improvement in signal strength over the active sector. For instance, a comparative signal-strength measure of 1 dB may indicate a 1 dB decline in signal strength over the active sector, whereas a comparative signal-strength measure of −1 dB may indicate a 1 dB increase in signal strength over the active sector, and a comparative signal-strength measure of −4 dB may indicate a 4 dB increase in signal strength over the active sector.

On the other hand a higher comparative codec-quality measure may indicate that the candidate sector provides more of an improvement in codec quality over the active sector. In particular, when the comparative signal-strength measure is determined by subtracting the operating-mode value of the candidate sector from the operating-mode value of the active sector, a higher comparative codec-quality measure may indicate that the candidate sector provides more of an improvement in codec quality over the active sector, and vice versa. For instance, a comparative codec-quality measure of −1 may indicate a one operating mode decline in codec quality as compared to the active sector (e.g., from COP 3 in the active sector to COP 4 in the candidate sector), whereas a comparative codec-quality measure of 1 may indicate a one operating mode increase in codec quality as compared to the active sector (e.g., from COP 3 in the active sector to COP 2 in the candidate sector), and a comparative signal-strength measure of 3 may indicate a three operating mode increase in codec quality as compared to the active sector (e.g., from COP 3 in the active sector to COP 0 in the candidate sector).

In the above-described implementation, the comparative signal-strength measure decreases and becomes more negative as the comparative signal strength of the candidate sector improves relative to the active sector. On the other hand, the comparative codec-quality measure increases as the as the comparative codec quality of the candidate sector increases. Further, the threshold (e.g., T_COMP) for the comparative signal-strength measure may be a positive value, to allow for a candidate sector with somewhat less signal strength to be added, while the threshold for the comparative codec-quality measure may be a negative value, to allow for a candidate sector with a somewhat lower quality codec to be added. Therefore, in order to allow for a combined score, the comparative signal-strength measure and/or the comparative codec-quality measure may be normalized.

For example, if T_COMP is set to 2 dB, then the BSC may normalize the comparative signal-strength measure by subtracting 2 dB and then taking the absolute value of the result. For instance, if the comparative signal-strength measure was −2 dB, then the normalized measure would be equal to 4 dB. Further, if the threshold for codec quality is set to an operating-mode difference value of −1, then the BSC may normalize the comparative codec-quality measure by adding 1 to the determined measure. For instance, if the comparative signal-strength measure is −1, then the normalized measure would be equal to 0, and if the comparative signal-strength measure is 1, then the normalized measure would be equal to 2. Thus, a greater normalized measure of comparative signal strength indicates that a greater improvement is provided by the candidate sector, and a greater normalized measure of comparative codec quality also indicates that a greater improvement is provided by the candidate sector.

After normalizing the comparative signal-strength measure and/or the comparative codec-quality measure, the BSC may determine the score for the candidate sector by adding the comparative signal-strength measure and the comparative codec-quality measure. For example, if the normalized comparative signal-strength measure is determined to be 4 dB, and the normalized comparative signal-strength measure is determined to be 3, then BSC may then determine the score for the candidate sector to be equal to 7. And, if the threshold score is equal to 4, for example, then the BSC may determine that the score for the candidate sector is greater the threshold and responsively instruct the WCD to add the candidate sector to the active set.

In another exemplary application, consider a scenario where a WCD is connected to a primary active sector PN1, and where the BSC has received a PSMM identifying two candidate sectors PN2 and PN3. In this scenario, the BSC may separately determine a comparative signal-strength measure for each candidate sector PN2 and PN3, as compared to the active sector PN1. The BSC may also query the BTS or BTSs serving the candidate sectors PN2 and PN3, and determine the codec that would be assigned to a WCD in sectors PN2 and PN3, if a codec was being assigned in the respective sector at that time. The BSC may then determine a separate operating-mode-difference value and score for each candidate sector PN2 and PN3, and compare the score for each sector to the threshold score. The BSC may then separately determine whether to add candidate sectors PN2 and PN3.

VI. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

I claim:

1. A method comprising:
a radio access network (RAN) determining a comparative signal-strength measure based on a comparison of a signal-strength measurement for a candidate sector to a signal-strength measurement for at least one active sector in an active set of a wireless communication device (WCD);
determining, by the RAN, whether or not the comparative signal-strength measure is less than a first threshold;
if the comparative signal-strength measure is less than a first threshold, then the RAN:
determining a comparative codec-quality measure based on a comparison of a first codec associated with the candidate sector to a second codec associated with the active sector;
determining whether or not the comparative codec-quality measure is greater than a second threshold; and
if the comparative codec-quality measure is greater than a second threshold, then sending a message to the WCD that indicates to add the candidate sector to the active set; and
otherwise, refraining from adding the candidate sector to the active set.

2. The method of claim 1, further comprising:
initially determining both the signal-strength measurement for the at least one active and the signal-strength measure for the candidate sector.

3. The method of claim 1, wherein the comparative signal-strength measure comprises a decibel-difference value.

4. The method of claim 1, wherein the at least one active sector is a primary active sector, wherein the WCD is currently configured to communicate via the primary sector.

5. The method of claim 1, wherein the first threshold is T_COMP.

6. The method of claim 1, further comprising, before comparing the first codec to the second codec, determining both the first and the second codec.

7. The method of claim 1, wherein the method is carried out by a base station controller (BSC), and wherein determining both the first and the second codec comprises:

receiving an indication of the first codec from a base transceiver station (BTS) that serves the at least one active sector; and
receiving an indication of the second codec from a base transceiver station (BTS) that serves the candidate sector.

8. The method of claim 1, wherein the first and the second codec are identified by a first and a second EVRC-NW operating mode value, respectively, and wherein comparing the first codec to the second codec associated to determine the comparative codec-quality measure comprises determining a difference between the first EVRC-NW operating mode value and the second EVRC-NW operating mode value.

9. The method of claim 8, wherein determining whether or not the comparative codec-quality measure is greater than a second threshold comprises determining whether or not the comparative codec-quality measure is greater than a threshold operating-mode value difference.

10. The method of claim 9, wherein the comparative codec-quality measure comprises an operating-mode-difference value.

11. The method of claim 1, wherein sending the message to the WCD that indicates to add the candidate sector to the active set comprises sending a handoff direction message (HDM) to the WCD.

12. A method comprising:
a radio access network (RAN) determining a comparative signal-strength measure based on a comparison of a signal-strength measurement for a candidate sector to a signal-strength measurement for at least one active sector in an active set of a wireless communication device (WCD);
determining, by the RAN, a comparative codec-quality measure based on a comparison of a first codec associated with the candidate sector to a second codec associated with the active sector;
based at least in part on both (a) the comparative signal-strength measure and (b) the comparative codec-quality measure, the RAN making a determination as to whether or not to add the candidate sector to the active set;
if the determination is to add the candidate sector to the active set, then sending a message from the RAN to the WCD that indicates to add the candidate sector to the active set; and
otherwise, refraining from adding the candidate sector to the active set.

13. The method of claim 10, wherein making the determination as to whether or not to add the candidate sector to the active set comprises:
determining a score for the candidate sector based on both (a) the comparative signal-strength measure and (b) the comparative codec-quality measure; and
determining whether or not the score is greater than a threshold score.

14. The method of claim 10, wherein the comparative signal-strength measure comprises a decibel-difference value, wherein the comparative codec-quality measure comprises an operating-mode-difference value, and wherein determining the score for the candidate sector comprises determining a sum of the decibel-difference value and the operating-mode-difference value.

15. The method of claim 10, further comprising normalizing at least one of the comparative signal-strength measure and the comparative codec-quality measure before the determining the score for the candidate sector.

16. A radio access network (RAN) component comprising:
a non-transitory computer-readable medium; and program instructions stored on the computer-readable medium and executable by at least one processor to:

determine a comparative signal-strength measure based on a comparison of a signal-strength measurement for a candidate sector to a signal-strength measurement for at least one active sector in an active set of a wireless communication device (WCD);

determine a comparative codec-quality measure based on a comparison of a first codec associated with the candidate sector to a second codec associated with the active sector;

based at least in part on both (a) the comparative signal-strength measure and (b) the comparative codec-quality measure, determine whether or not to add the candidate sector to the active set;

if the determination is to add the candidate sector to the active set, then send a message to the WCD that indicates to add the candidate sector to the active set; and if the determination is to not add the candidate sector to the active set, then refrain from adding the candidate sector to the active set.

17. The RAN component of claim 16, wherein the RAN component is implemented in or takes the form of a base station controller (BSC).

18. The RAN component of claim 16, wherein program instructions stored on the computer-readable medium and executable by at least one processor to determine whether or not to add the candidate sector to the active set comprise program instructions stored on the computer-readable medium and executable by at least one processor to:

determine a score for the candidate sector based on both (a) the comparative signal-strength measure and (b) the comparative codec-quality measure; and determine whether or not the score is greater than a threshold score.

19. The RAN component of claim 16, wherein the comparative signal-strength measure comprises a decibel-difference value, wherein the comparative codec-quality measure comprises an operating-mode-difference value, and wherein the determination of the score for the candidate sector comprises a determination of a sum of the decibel-difference value and the operating-mode-difference value.

20. The RAN component of claim 16, further comprising program instructions stored on the computer-readable medium and executable by at least one processor to normalize at least one of the comparative signal-strength measure and the comparative codec-quality measure before the determination of the score for the candidate sector.

* * * * *